United States Patent
Aaron et al.

(10) Patent No.: US 7,793,879 B2
(45) Date of Patent: Sep. 14, 2010

(54) APPARATUS AND METHOD FOR REVERSING TAPEWIND DIRECTION

(75) Inventors: Robert C. Aaron, Bois, ID (US); Jeffrey S. McAllister, Boise, ID (US); James C. Anderson, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 305 days.

(21) Appl. No.: 11/697,303

(22) Filed: Apr. 6, 2007

(65) Prior Publication Data

US 2008/0277518 A1 Nov. 13, 2008

Related U.S. Application Data

(62) Division of application No. 10/716,257, filed on Nov. 18, 2003.

(51) Int. Cl.
*G11B 15/66* (2006.01)
(52) U.S. Cl. .................................. 242/332.4; 242/332.7
(58) Field of Classification Search ................. 242/332, 242/332.4, 332.7, 332.8, 532.1, 532.6, 532.7, 242/582; 360/132
See application file for complete search history.

(56) References Cited

U.S. PATENT DOCUMENTS

| | | | | |
|---|---|---|---|---|
| 4,709,873 A | * | 12/1987 | Smith et al. | 242/332.8 |
| 4,828,201 A | * | 5/1989 | Smith | 242/332.4 |
| 5,542,620 A | * | 8/1996 | Ohshita | 242/332.4 |
| 5,979,813 A | * | 11/1999 | Mansbridge et al. | 242/332.4 |
| 6,079,651 A | * | 6/2000 | Hamming | 242/332.4 |
| 6,360,978 B1 | * | 3/2002 | Augustin et al. | 242/332.4 |
| 6,364,232 B1 | * | 4/2002 | Nemeth et al. | 242/332.4 |
| 6,398,142 B1 | * | 6/2002 | Kletzl et al. | 242/332.4 |
| 6,398,143 B1 | * | 6/2002 | Kim et al. | 242/332.4 |
| 7,063,286 B2 | * | 6/2006 | Masuda | 242/332.4 |
| 7,500,633 B1 | * | 3/2009 | Rudi et al. | 242/532.6 |
| 7,520,461 B1 | * | 4/2009 | Rudi et al. | 242/332.8 |

* cited by examiner

*Primary Examiner*—William A Rivera

(57) ABSTRACT

According to one embodiment, the present technique provides a reel. The exemplary reel comprises a hub and a guide member coupled to the hub. The guide member may be configured to guide magnetic tape from a magnetic tape source to the reel. The guide member may cooperate with the hub to form a surface for receiving magnetic tape from the magnetic tape source. Additionally, the exemplary reel may include a securing mechanism for securing the guide member in the cooperating position with respect to the hub.

15 Claims, 5 Drawing Sheets

APPARATUS AND METHOD FOR REVERSING TAPEWIND DIRECTION

CROSS REFERENCE TO RELATED APPLICATIONS

This application is a divisional application of U.S. patent application having Ser. No. 10/716,257 filed Nov. 18, 2003.

BACKGROUND

To store large amounts of data, magnetic tape drives and magnetic tape are commonly employed. By way of example, a user may insert a magnetic tape cartridge, which includes a cartridge reel with magnetic tape wound around it, into the magnetic tape drive. Subsequently, the magnetic tape from the cartridge reel may be threaded through the drive and wound onto a take-up reel. As the take-up reel rotates, it unwinds the magnetic tape from the cartridge reel and winds the tape onto the take-up reel.

In some magnetic tape drives, the cartridge reel and the take-up reel may rotate in opposite directions with respect to one another during operation. For example, the cartridge reel may rotate in a clockwise orientation, whereas the take-up reel may rotate in a counter-clockwise orientation, or vice versa. Divergent winding directions may cause inconsistent spooling or packing of the magnetic tape on the take-up reel, for example. This inconsistency may lead to tape spoking, which are radial ripples on the surface of the wound tape. In turn, tape spoking may cause lateral motion of the tape as it is routed through the drive, leading to edge damage of the tape. Edge damage may lead to loss of data and a reduction in the performance of the tape drive.

DETAILED DESCRIPTION OF SPECIFIC EMBODIMENTS

According to one embodiment, the present invention provides a take-up reel for magnetic tape. The take-up reel is operable in both clockwise and counter-clockwise directions. The exemplary take-up reel comprises an arcuate hub having a flattened portion for receiving a half-moon shaped guide member that is configured to guide and draw magnetic tape from a source reel. When appropriately positioned, the hub and the guide member may cooperate to form a substantially continuous surface for winding magnetic tape from the source reel onto the take-up reel. The exemplary take-up reel also includes a mechanism for securing the cooperating position of the guide member with respect to the hub. By securing the guide member, the magnetic tape may be wound onto the take-up reel in either a clockwise direction or a counter-clockwise direction. Moreover, the securing mechanism facilitates rotation of the source reel and the take-up reel in the same direction during operation. For example, the source reel and the take-up reel both may rotate in a clockwise direction during operation of the exemplary tape drive. Such coordinated rotation of the source reel and take-up reel may improve the packing of the magnetic tape on the take up reel and also may reduce the occurrence of disturbances in the tape, such as tape spoking and pack bumps.

Figure 1:
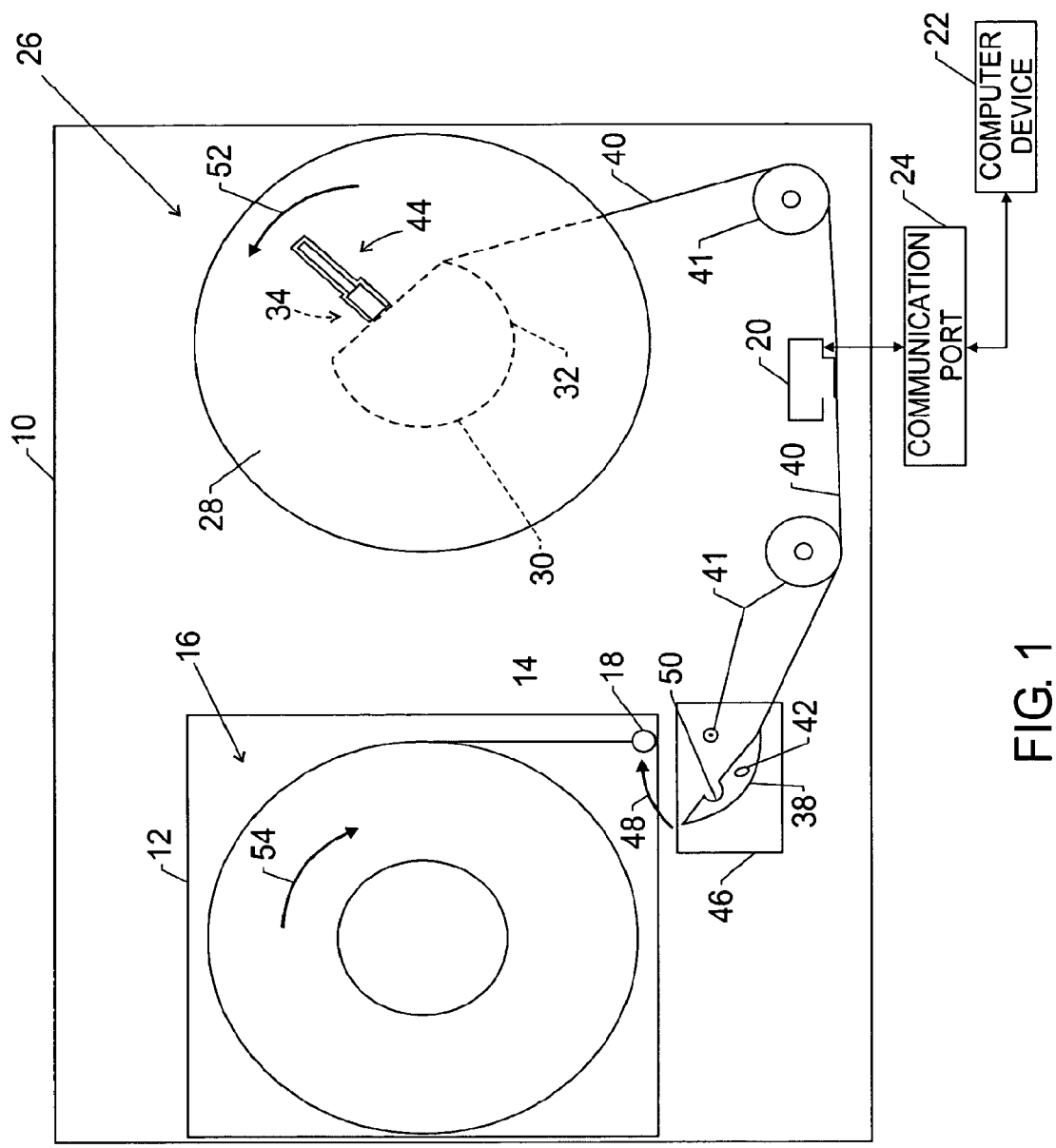
FIG. 1 is a representation of an exemplary magnetic tape drive and tape cartridge in an unengaged configuration, in accordance with certain embodiments of the present invention.

Turning to the figures, FIG. 1 represents an exemplary tape drive assembly 10 for accessing and storing data on magnetic tape. The exemplary tape drive assembly 10 may receive an ejectable tape cartridge 12, which includes magnetic tape 14 wound around a source reel 16. The cartridge 12 may be a self-contained unit that houses the source reel 16 and the magnetic tape 14. Accordingly, a user may insert a cartridge 12 with blank magnetic tape 14 into the tape drive assembly 10. Alternatively, the user may insert a cartridge 12 with data already stored on the magnetic tape 14 for reading by the tape drive assembly 10. Upon completion of writing data to and/or reading data from the magnetic tape 14, the drive assembly 10 may rewind the magnetic tape 14 onto the source reel, as discussed further below. Moreover, the tape drive assembly 10 may eject the rewound source reel, also as discussed further below. To aid in guidance of the magnetic tape 14 through the tape drive assembly 10, the magnetic tape 14 may include a leader pin 18 located at the free end of the magnetic tape 14, as discussed further below.

To access the magnetic tape 14 for the storage and retrieval of data, the tape drive assembly 10 may include one or more magnetic data heads 20. The data head 20 may communicate with a computer device 22, such as a processor-based laptop computer, a desktop computer, or a server, via a communication port 24. Moreover, the tape drive assembly 10, particularly the data head 20, may communicate with a network, such as a local area network (LAN), a wide-area network (WAN), or a storage area network (SAN). In the exemplary tape drive assembly 10, the data head 20 reads and/or writes data on the magnetic tape 14 as it is drawn across the data head 20, as discussed further below.

The exemplary tape drive assembly 10 includes a take-up reel 26 that draws (i.e., unwinds) magnetic tape 14 from the source reel 16. As the magnetic tape 14 is unwound from the source reel 16, the magnetic tape 14 is wound onto the take-up reel 26. The exemplary take-up reel 26 includes a pair of disc-shaped flanges 28 (see FIG. 3) separated by a hub 30, which is shown in dashed line in FIG. 1. The exemplary hub 30 has a generally arcuate perimeter 32 that intersects with a flattened region 34. As discussed further below, the flattened region 34 of the hub 30 may interact with a guide member 38 to form a continuous surface for receiving and winding the magnetic tape 14 onto the take-up reel 26.

The exemplary guide member 38 is a half-moon shaped structure configured to engage with the leader pin 18 located on the free end of the magnetic tape 14. The guide member 38 may be coupled to the hub 30 by a leader tape 40. The leader tape 40 may be similar to the magnetic tape 14 in shape and consistency. Additionally, the leader tape 40 may be pre-threaded through the path of travel for the magnetic tape 14 between the source reel 16 and the take-up reel 26. That is, the leader tape 40 may be pre-threaded to pass across the data head 20 and rollers 41, which may maintain tension in the leader tape 40 and magnetic tape 14 and may facilitate directional transition of the leader tape 40 and the magnetic tape 14 during the operation of the tape drive assembly 10. In FIG. 1, it should be noted that the portion of the leader tape 40 hidden by the flange 28 (i.e., located behind the flange 28) is illustrated in dashed line. Additionally, the guide member 38 may include recessed surfaces 42 configured to engage with a securing mechanism 44 located on the take-up reel 26, as discussed further below.

To initiate a winding process, an engagement mechanism 46 may direct the guide member 38 towards the leader pin 18, as represented by directional arrow 48. As discussed further below, a notched region 50 located on the guide member 38 may grasp the leader pin 18 upon abutment of the two structures, thereby coupling the magnetic tape 14 and the source reel 16 to the take-up reel 26. Accordingly, by rotating the take-up reel 26 in a counter-clockwise direction, as represented by directional arrow 52, the guide member 38 begins to pull on the magnetic tape 14. The tension in the magnetic tape 14 being pulled causes the source reel 16 to rotate in a clockwise direction, as represented by directional arrow 54. The exemplary tape drive assembly 10 may include a take-up reel actuator, such as an electric motor, configured to rotate the take-up reel 26 in the desired directions.

Figure 2:
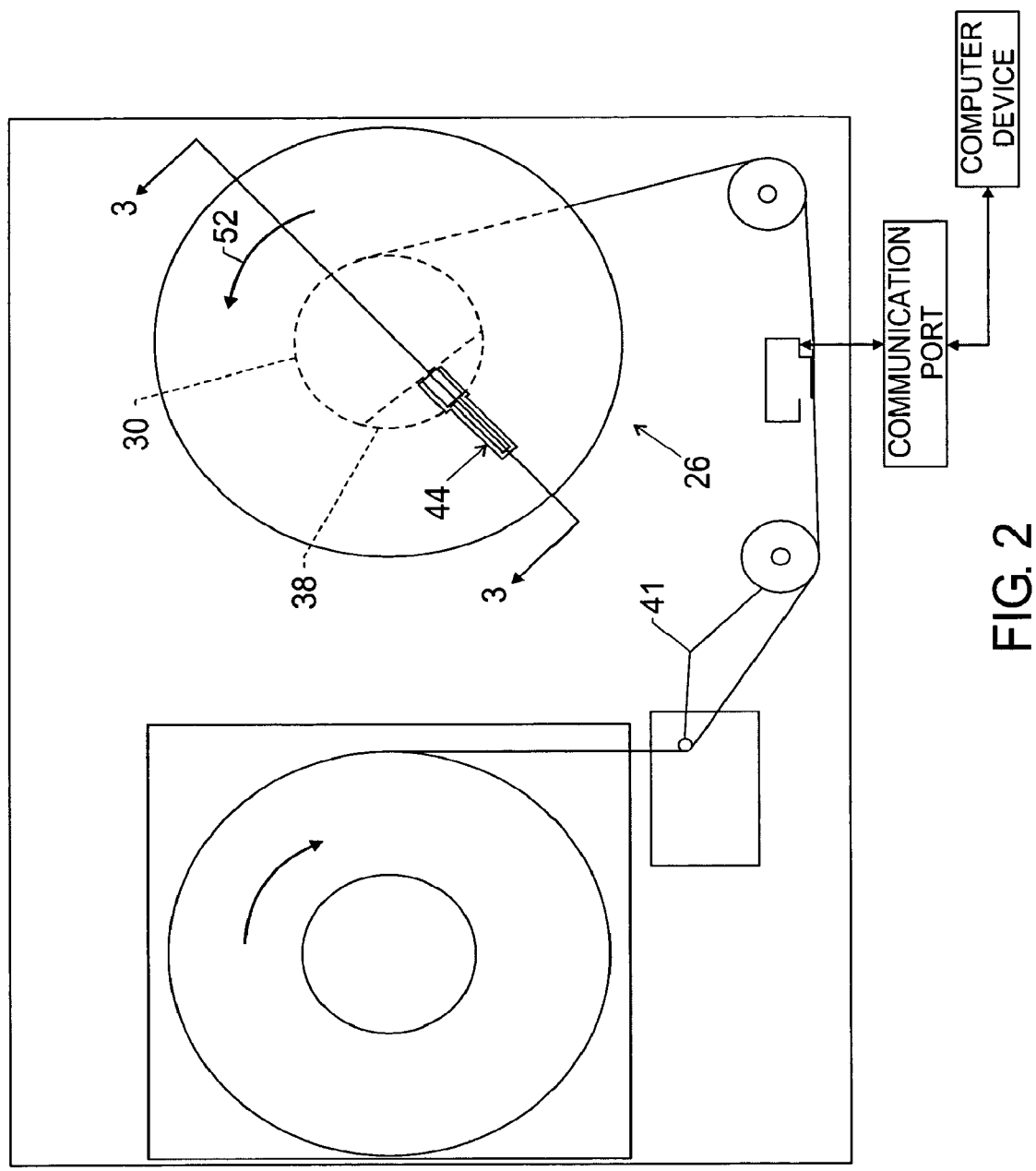
FIG. 2 is a representation of the exemplary magnetic tape drive of FIG. 1 in an initial winding configuration, in accordance with certain embodiments of the present invention.

During the winding process, the leader tape 40 winds around the arcuate perimeter 32 of the hub 30 as well as the flattened region 34 of the hub 30. As the leader tape 40 is wound around the hub 32, the leader tape 40 draws the guide member 38 toward the take-up reel 26. Because of the pre-threading of the leader tape 40, the guide member 38 travels a path across the rollers 18 and the data head 20 towards the take-up reel 26. Moreover, because the guide member 38 is coupled to the magnetic tape 14 via the leader pin 18, the magnetic tape 14 is also drawn along this path towards the take-up reel 26. The leader tape 40 may be sized to position the guide member 38 onto the flattened region 34 of the hub 30 when the leader tape 40 is almost, if not completely, wound around the hub 30. That is, the length of the leader tape 40 places the flat portion of the half-moon shaped guide member 38 against the flattened region 34 of the hub. Accordingly, the arcuate perimeter 32 of the hub and the arcuate portion of the half-moon shaped guide member 38 may cooperate to form a substantially continuous surface for receiving the magnetic tape 14 during the winding process, as illustrated in FIG. 2. Indeed, this positioning of the hub 30 and the guide member 38 may be accomplished by coordinating the length of the leader tape with the circumference of the guide member 38.

Figure 3:
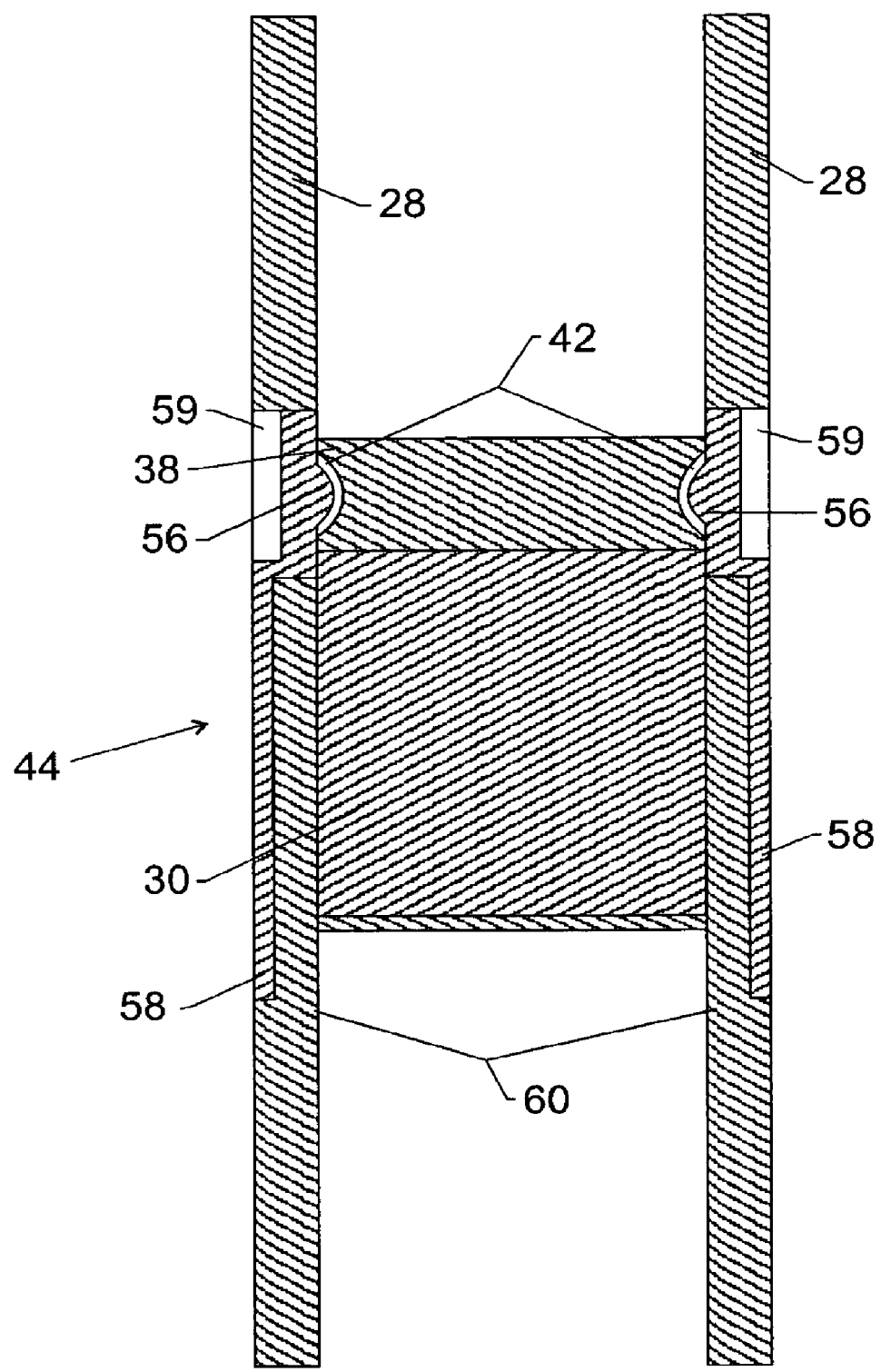
FIG. 3 is a cross-sectional view of a take-up reel of the magnetic tape drive of FIG. 2 along line 3-3, in accordance with certain embodiments of the present invention.

With FIG. 2 in mind, FIG. 3. illustrates that the securing mechanism 44 may releasably secure the position of the guide member 38 with respect to the hub 30. By way of example, the securing mechanism 44 may include tab members 56, which interact with the correspondingly shaped recessed regions 42 located on the guide member 38 to releasably secure the position of the guide member 38 with respect to the hub 30. The securing mechanism 44 may also include resilient members 58 located in flange recesses 60. The resilient members 58 may couple to the tab members 56 through access apertures 59 located in the flanges 28. Alternatively, the tab members may be located on the guide member 38 and the corresponding recessed regions may be formed in the resilient members 58. The resilient members may bias the tabbed portions 56 into engagement with the recessed regions of the guide member 38. The resilient member 58 and the tab members 56 may be integral with respect to one another or may be an assembly of parts. The resilient members 58 also may facilitate the release of the guide member 38 during the unwinding process and/or the ejection phase, as discussed further below. As another example, the securing mechanism 44 may include corresponding tab and notch structures located on the hub 30 and guide member 38. As yet a further example, the hub, the guide member, and/or the securing mechanism 44 may comprises magnetic components, which may be electromagnetic in nature, to secure the position of the guide member 38 with respect to the hub 30. Indeed, any suitable securing mechanism for securing the position of the guide member 38 with respect to the hub 30 may be used.

To ensure seating of the guide member 38 with respect to the hub 30 and to ensure engagement of the securing mechanism with the guide member 38, the take-up reel actuator may rotate the take-up reel 26 a small number of revolutions (e.g., four revolutions) in the counter-clockwise direction 52. This limited rotation may cause an initial amount of magnetic tape 14 to wind around the hub 30 and guide member 38, thereby compressing the two structures with respect to one another.

Figure 4:
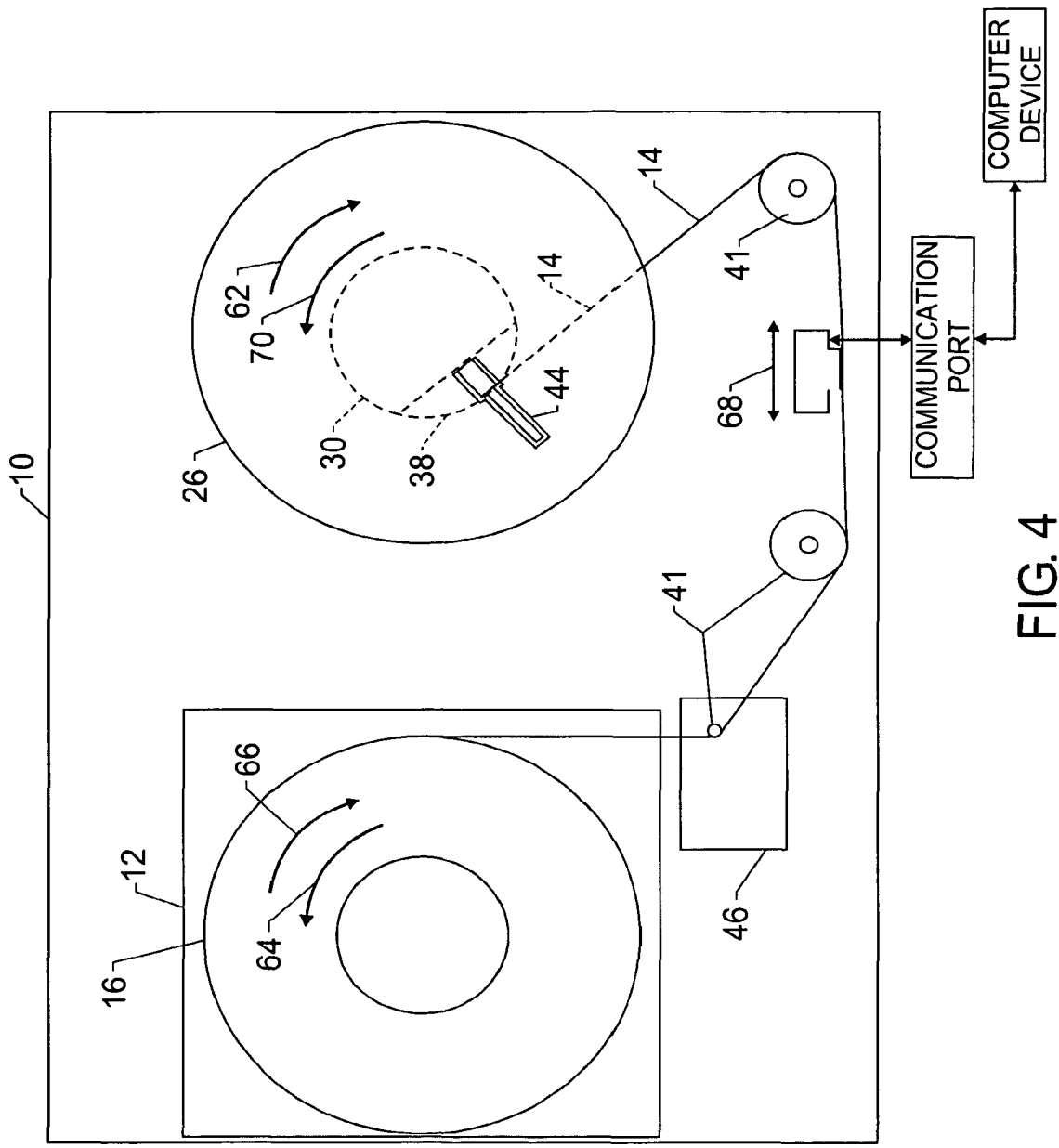
FIG. 4 is a representation of the exemplary magnetic tape drive of FIG. 4 in an operational configuration, in accordance with certain embodiments of the present invention.

Once the guide member 38 has been properly seated and secured, the exemplary tape drive assembly 10 may begin a setting process, as illustrated in FIG. 4. During the initial phases of the setting process, the take-up reel actuator may rotate the take-up reel 26 in a clockwise direction, as represented by directional arrow 62. This initial clockwise rotation 62 causes the magnetic tape 14 wound around the hub 30 and guide member 38 to unwind. To accommodate for the slack in the magnetic tape 14 caused by this unwinding and to maintain tension in the magnetic tape 14, the exemplary tape drive assembly 10 may include a source reel actuator, which causes the source reel 16 to rotate in the counter-clockwise direction, as represented by directional arrow 64. At the conclusion of the initial phase of the setting process, the magnetic tape is unwound from the guide member 38 and hub 30. The securing mechanism 44 may prevent movement of the guide member 38 induced by the tension in the magnetic tape 14. That is, the tension in the magnetic tape 14 during the setting process fails to uncouple the guide member 38 from the securing mechanism 44. Accordingly, the hub 30 and the guide member 38 remain in cooperation with one another to receive magnetic tape 14. Additionally, at the conclusion of the of the setting process, the source reel actuator may disengage with respect to the source reel 16, thereby allowing the source reel 16 to rotate freely and in response to the rotation of the take-up reel.

The exemplary tape drive mechanism 10 then may enter begin an operational process. During this process, the take-up reel actuator may rotate the magnetic tape in the clockwise direction 62. Accordingly, the magnetic tape 14 winds around the hub 30 and guide member 38 in a clockwise direction 62 as well. The winding of the magnetic tape 14 onto to the take-up reel 26 causes magnetic tape 14 to be drawn off of the source reel 26 in a clockwise direction, as represented by directional arrow 66. Thus, the take-up reel 26 and the source reel 16 rotate in the same direction. That is, unwinding of magnetic tape 14 from the source reel 16 and winding of magnetic tape 14 onto the take-up reel occur via rotation of the source reel 16 and the take-up reel 26 in the same direction.

Rotation of the take-up reel 26 and the source reel 16 in the same direction may be desired in some embodiments. For example, a tighter tape pack may be achieved because the orientation of the magnetic layer on the magnetic tape 14 now face away from the center of the reel on both the source reel 16 and the take-up reel 26. Additionally, when a tighter tape pack is achieved, the likelihood of damage to the magnetic tape 14 due to lateral movement of the magnetic tape 14 is reduced. For example, a tighter tape pack may mitigate the likelihood of damage caused by lateral movement of the magnetic tape 14 into the flanges 28 of the take-up reel 26. A reduction in lateral movement of the magnetic tape 14 may lead to better data integrity and may increase the life expectancy of the magnetic tape 14. Furthermore, by rotating the take-up reel 26 and the source reel 16 in the same direction, the likelihood of tape spoking may be reduced. Tape spoking appears as radial ripples in the magnetic tape 14 and may be caused by deformation of the edges of the magnetic tape 14 due to a large number of wind and rewind cycles.

During the operational process, it may be necessary to access data located at a particular location on the magnetic tape 14. Accordingly, the magnetic tape 14 may be wound or unwound from the take-up reel 26. That is, the magnetic tape may travel across in the data head 20 in both forward and reverse directions, as represented by directional arrows 68. To wind the tape onto the take-up reel (i.e., the forward direction), the take-up reel actuator may rotate the take-up reel 26 in the clockwise direction 62, thereby drawing and unwinding the magnetic tape 14 from the source reel 16 and rotating the source reel 16 in the clockwise direction 66. Alternatively, to wind the tape onto the source reel (i.e., the reverse direction), the source reel actuator may rotate the source reel in the counter-clockwise direction 64, thereby drawing and unwinding magnetic tape from the take-up reel 26 and rotating the take-up reel in a counter clockwise direction, as represented by directional arrow 70. In either event, the take-up reel 26 and the source reel 16 rotate in the same direction.

To eject the tape cartridge 12 from the tape drive assembly 10, it may be desirable to rewind all of the magnetic tape 14 back onto the source reel 16, i.e., a rewind process. For example, if the appropriate data has been stored on the magnetic tape 14 or if the appropriate data has been accessed from the magnetic tape 14, it may be advantageous to remove (i.e., eject) the tape cartridge 12 from the tape drive assembly 10. Accordingly, the source reel actuator may rotate the source reel 16 in the counter-clockwise direction 64, thereby unwinding magnetic tape 14 from the take-up reel and rewinding it onto the source reel 16. Rotation of the source reel 16 in the counter-clockwise direction 64 causes the take-up reel to rotate in the counter-clockwise direction 70 as well.

Near the conclusion of the rewind process, the source reel 16 may have unwound essentially all of the magnetic tape 14 off of the take-up reel. Accordingly, the continued rotation of the source reel 16 may increase the tension in the magnetic tape 14, thereby releasing the guide member 38 from the securing mechanism 44. For example, the tension in the magnetic tape 14 may overcome the biasing forces of the resilient members 58 (see FIG. 3), thereby disengaging the tab members 56 (see FIG. 3) from the recessed regions 42 (see FIG. 3) located on the guide member 38. Once released, the guide member 38 may return along the magnetic tape path (i.e., across the rollers 41 and data head 20) to the engagement mechanism. Advantageously, the return trip rethreads the leader tape 40 with respect to the rollers 41 and the data head 20. Additionally, the engagement mechanism 46 may recapture the guide member 38. By restraining the guide member 38, the continued rotation of the source reel 16 may cause the tension in the magnetic tape 14 to increase. The increased tension in the magnetic tape 14 may cause the leader pin 18 to disengage from the notched region 50 of the guide member, thereby uncoupling the source reel 16 and the take-up reel 26. Accordingly, a tape cartridge ejection mechanism may eject the tape cartridge 12 from the tape drive assembly 10. More-over, the engagement mechanism 46 may reset the guide member 38 for engagement with a leader pin from a new cartridge.

Figure 5:
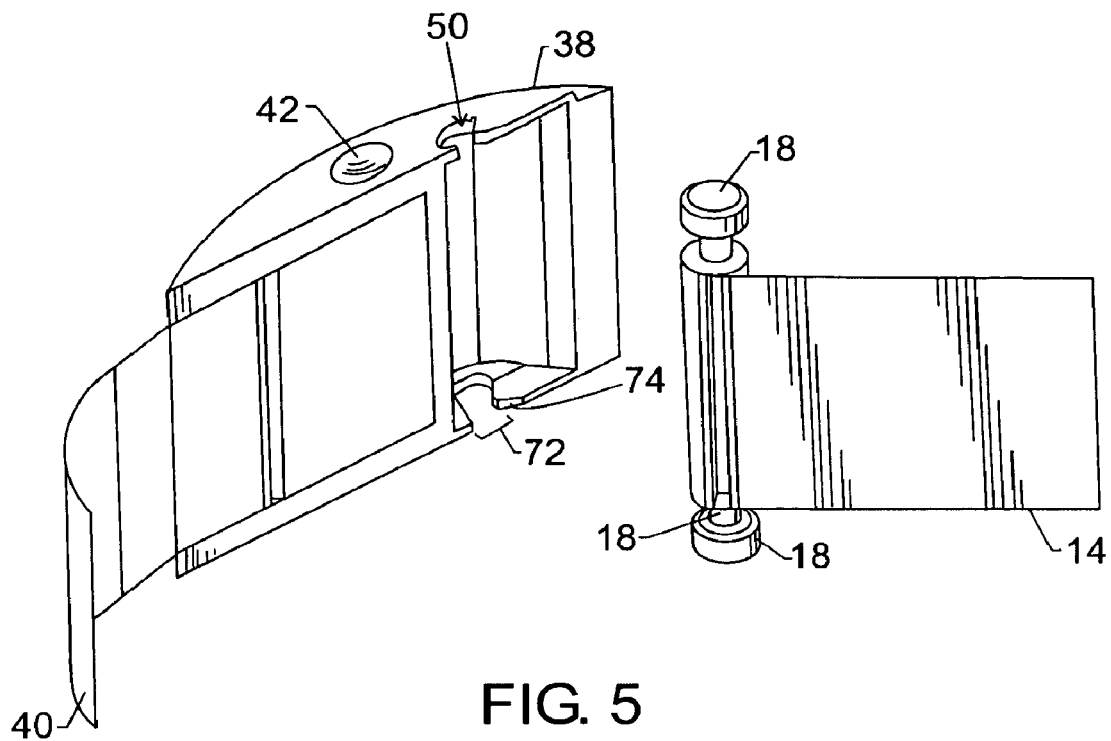
FIG. 5 is a perspective view of an exemplary guide member in an uncoupled configuration with respect to a magnetic tape, in accordance with certain embodiments of the present invention.
Figure 6:
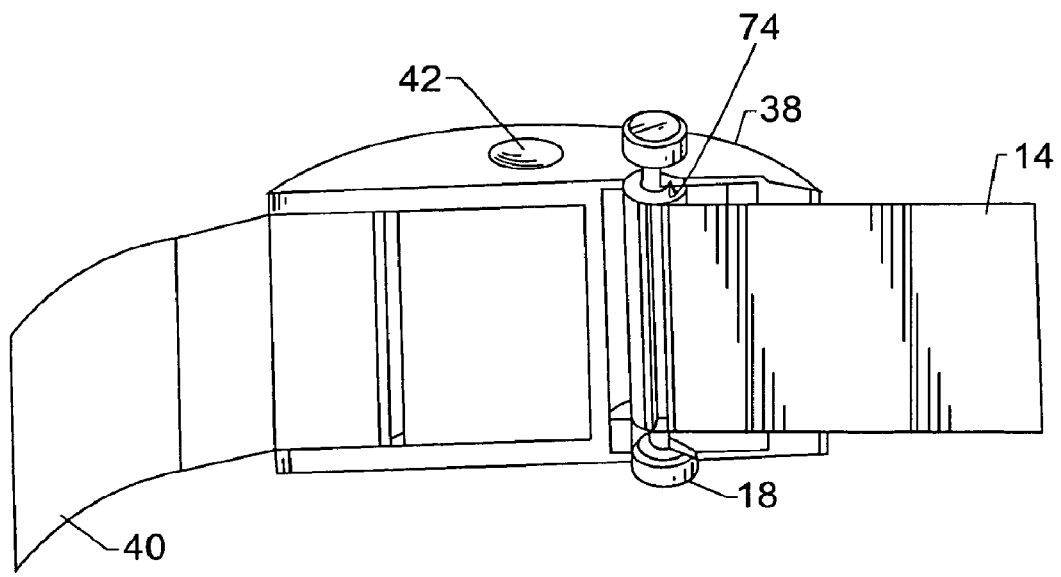
FIG. 6 is a perspective view of the exemplary guide member of FIG. 5 in a coupled configuration with respect to the magnetic tape, in accordance with certain embodiments of the present invention.

Turning to FIGS. 5 and 6, perspective views of an exemplary guide member 38 are illustrated. Specifically, FIG. 5 illustrates the guide member 38 prior to coupling with the leader pin 18 of the magnetic tape 14 with the notched regions 50 of the guide member 38. As discussed above, the engagement mechanism 46 (see FIG. 1) may drive the guide member 38 towards the leader pin 18. Guide surfaces 72 located in the notched regions 50 of the guide member may interact with the leader pin 18 to guide the leader pin 18 into a releasably engaged position with respect to the guide member. Focusing on FIG. 6, the figure illustrates the exemplary guide member 38 in an engaged position with respect to the leader pin 18. As illustrated, a catch portion 74 extends from the notched region to maintain the engagement between the leader pin 18 and the guide member 38. By way of example, if a sufficient amount of tension is applied to the leader pin by the rotation of the source reel 16 (see FIG. 4), the leader pin may disengage from the guide member 38. That is, the leader pin may overcome the resistance applied by the catch portion 74. Advantageously, this releasablity facilitates uncoupling of the leader pin 18 from the guide member 38 during the rewind process, as discussed above.

What is claimed is:

1. A method for winding magnetic tape, comprising:
    rotating a first reel in a first direction to couple a guide member connected to a leader tape on the first reel to a leader pin connected to magnetic tape on a second reel;
    rotating the first reel in a second direction opposite the first direction to secure the guide member and the leader pin to a hub of the first reel such that the hub and the guide member cooperate to form a surface that receives the magnetic tape; and
    rotating the first reel in the first direction to wind the magnetic tape from the second reel onto the first reel.

2. The method as recited in claim 1, comprising rotating the second reel in the second direction to accommodate for slack in the magnetic tape caused by the first reel rotating in the first direction.

3. The method as recited in claim 1, comprising rotating the first and second reels in a same direction to wind the magnetic tape from the second reel to the first reel.

4. The method as recited in claim 1, comprising rotating the first and second reels in a clock-wise direction.

5. The method as recited in claim 1, comprising rotating the first and second reels in a counter clock-wise direction.

6. A method for winding magnetic tape, comprising:
    rotating a take-up reel in a first direction until a guide member engages a flattened region of a hub to form a continuous surface that receives magnetic tape;
    rotating the take-up reel in a second direction opposite the first direction in order to wind the magnetic tape around the hub and onto the take-up reel.

7. The method as recited in claim 6, wherein the first direction is counter clockwise and the second direction is clockwise.

8. The method as recited in claim 6 further comprising, engaging the guide member with a securing mechanism on the take-up reel.

9. The method as recited in claim 6 further comprising, moving the guide member onto the hub until a flat portion on the guide member engages the flattened region of the hub.

10. The method as recited in claim 6 further comprising, biasing tabbed portions on the take-up reel with recesses in the guide member to secure the guide member to the take-up reel.

11. The method as recited in claim 6 further comprising, unwinding the magnetic tape off a source reel in a clockwise direction while simultaneously winding the magnetic tape onto the take-up reel in the clockwise direction.

12. The method as recited in claim 6 further comprising, moving resilient members on the take-up reel to engage and secure the guide member to the take-up reel.

13. A tape drive, comprising:
 a first reel having a hub and leader tape connected to a guide member;
 a second reel having a leader pin connected to magnetic tape; and
 a drive assembly that rotates the first reel a first direction to couple the guide member to the leader pin, rotates the first reel in a second direction opposite the first direction to secure the guide member and the leader pin to the first reel such that the hub and the guide member cooperate to form a surface that receives the magnetic tape, and rotates the first reel in the first direction to wind the magnetic tape from the second reel onto the first reel.

14. The tape drive of claim 13, wherein the second reel is ejectable from the tape drive and rotates in the second direction to accommodate for slack in the magnetic tape caused by the first reel rotating in the first direction.

15. The tape drive of claim 13, wherein the first and second reels rotate in a same direction to wind the magnetic tape from the second reel to the first reel.

* * * * *